J. & J. STOCK.
Photographic Camera.
No. 166,315.
2 Sheets--Sheet 1.
Patented Aug. 3, 1875.
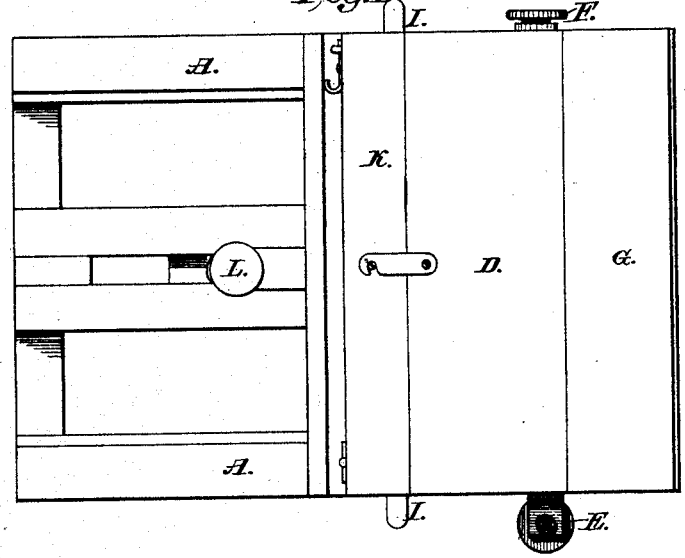
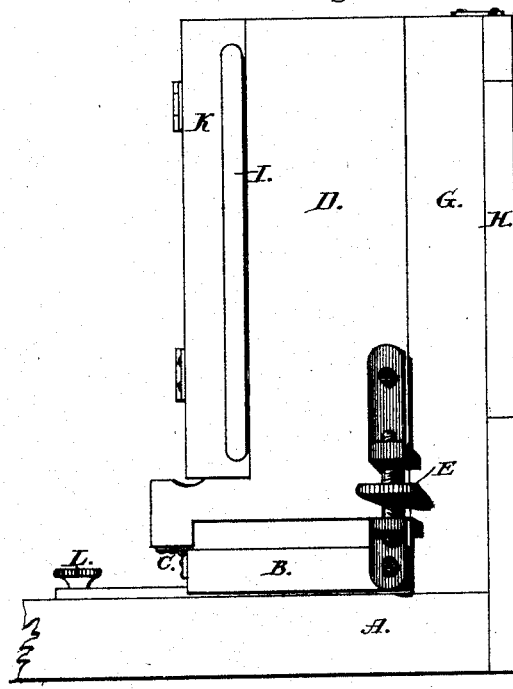
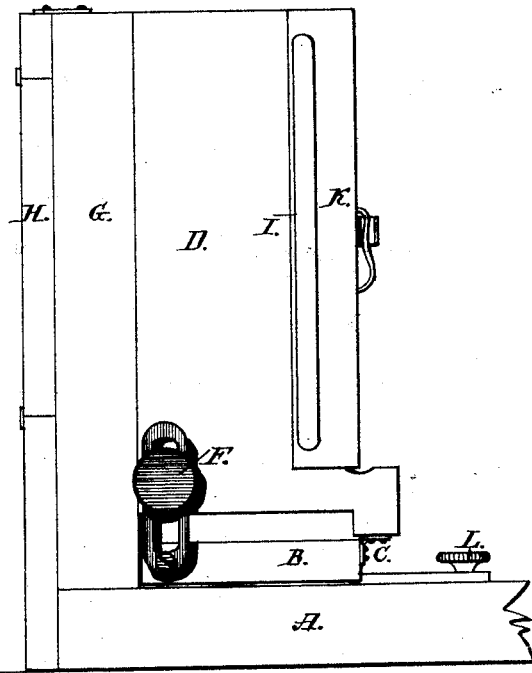
Witnesses:
Aug. G. Scheller.
Julius L. Krisch.
Inventors:
John Stock
Jacob Stock 2 Sheets--Sheet 2.
J. & J. STOCK.
Photographic Camera.
No. 166,315.   Patented Aug. 3, 1875.
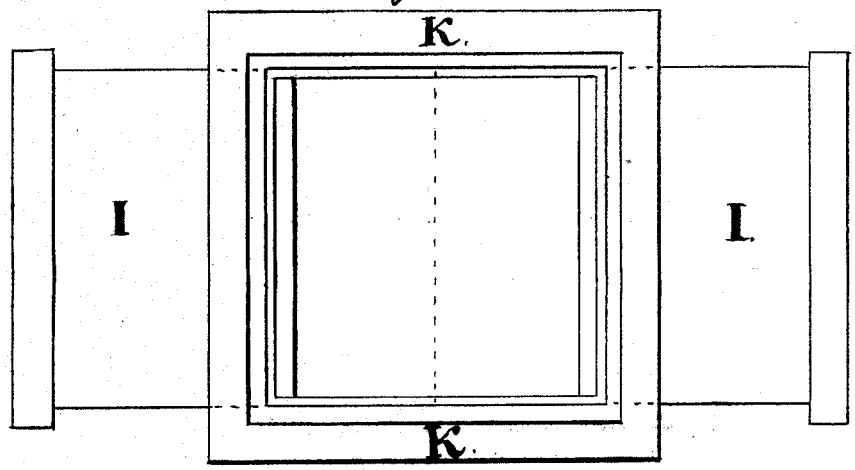
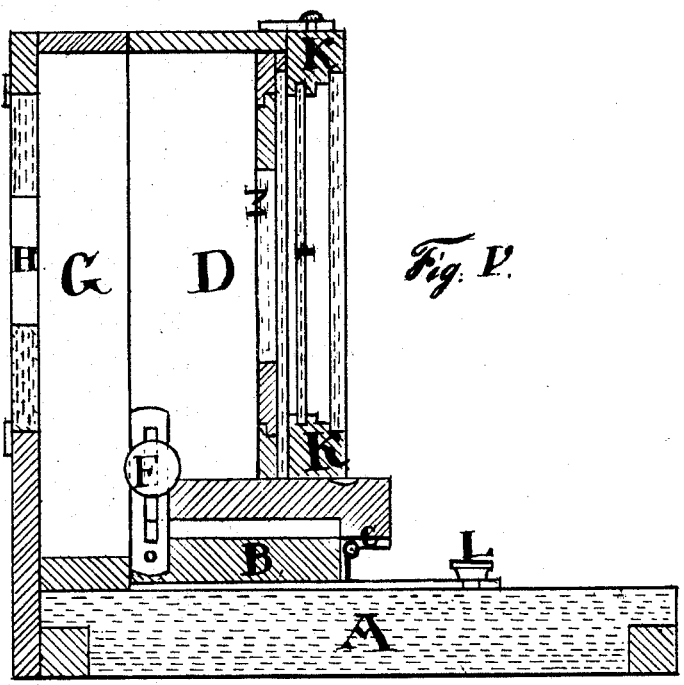
Witnesses.
Aug. G. Scheller.
Julius L. Krisch.
Inventors.
John Stock
Jacob Stock

UNITED STATES PATENT OFFICE.

JOHN STOCK AND JACOB STOCK, OF NEW YORK, N. Y.

IMPROVEMENT IN PHOTOGRAPHIC CAMERAS.

Specification forming part of Letters Patent No. 166,315, dated August 3, 1875; application filed January 25, 1875.

*To all whom it may concern:*

Be it known that we, JOHN STOCK and JACOB STOCK, both of the city of New York, in the county and State of New York, have invented a new and useful Improvement in Photographic Cameras, of which the following is a description:

The nature of our improvement consists in the manner of adjusting the swinging of the entire back part of the camera-box by means of the screw E, which allows and enables the operator to bring the entire back part of the camera-box in any desired position.

The peculiar advantage of this improvement will be made plain and fully understood by the following accompanying drawings:

In the accompanying drawing, Figure I is the ground plan. Figs. II and V represent the side elevations. Fig. III represents the front of the camera-box. Fig. IV represents the plate-holder when the slides are drawn out on both sides.

Similar letters represent similar parts in all the figures.

A is the bed of the camera-box. B is the bed-plate or the way on which the camera-box is made to move. C is the hinge fastened to the bed-plate, and connecting the same with the entire back part of the camera-box. D D represent the views of the entire back part of the camera-box. E E is the screw on the side of the camera for swinging the entire back part of the camera-box. F is the set-screw on the back part of the camera-box, running in a slot, which, when set, keeps the back part of the camera-box permanently in a steady position. G, Fig. II, represents the side elevation of the front part of the camera-box, with the shifting front H. H, Fig. III, is the front elevation of the camera-box, with the slides H drawn out, as marked by points. I, Fig. IV, is a view of the plate-holder, with the slides I of the plate-holder when drawn out on both sides. K is the plate-holder attached to the camera-box. L is the focusing-screw. M is the die-frame.

In focusing, the head of the picture will be kept more in the proper position, and the operator will not find any difficulty at all in setting all the other parts of the picture in the exactly required line.

In order to obtain this effect the operator should proceed as follows, viz: Give a single turning to the screw E, and the entire back part of the camera-box will be moved forward and backward, and by fastening the screw F, Fig. V, the entire back part of the camera-box will be kept permanently in a steady, unchangeable position.

In the operation of taking the picture, the sliding front part of the camera-box H, Fig. V, should be drawn out on one side, and the slide I, Fig. IV, of the stationary plate-holder should also be drawn out on the same side; then, in closing, the plate-holder should be moved to the other side, and accordingly the slide I of the plate-holder should be drawn out for taking the other impression.

What we claim as our invention, and desire to secure by Letters Patent, is—

The adjusting-screw E on the entire back part of the camera-box D, working by nut or nuts, in combination with the bed-plate B, for adjusting the camera-box D, in the manner as described.

JOHN STOCK.
JACOB STOCK.

Witnesses:
AUG. G. SCHELLER,
JULIUS L. KRISCH.